United States Patent Office 2,865,222
Patented Dec. 23, 1958

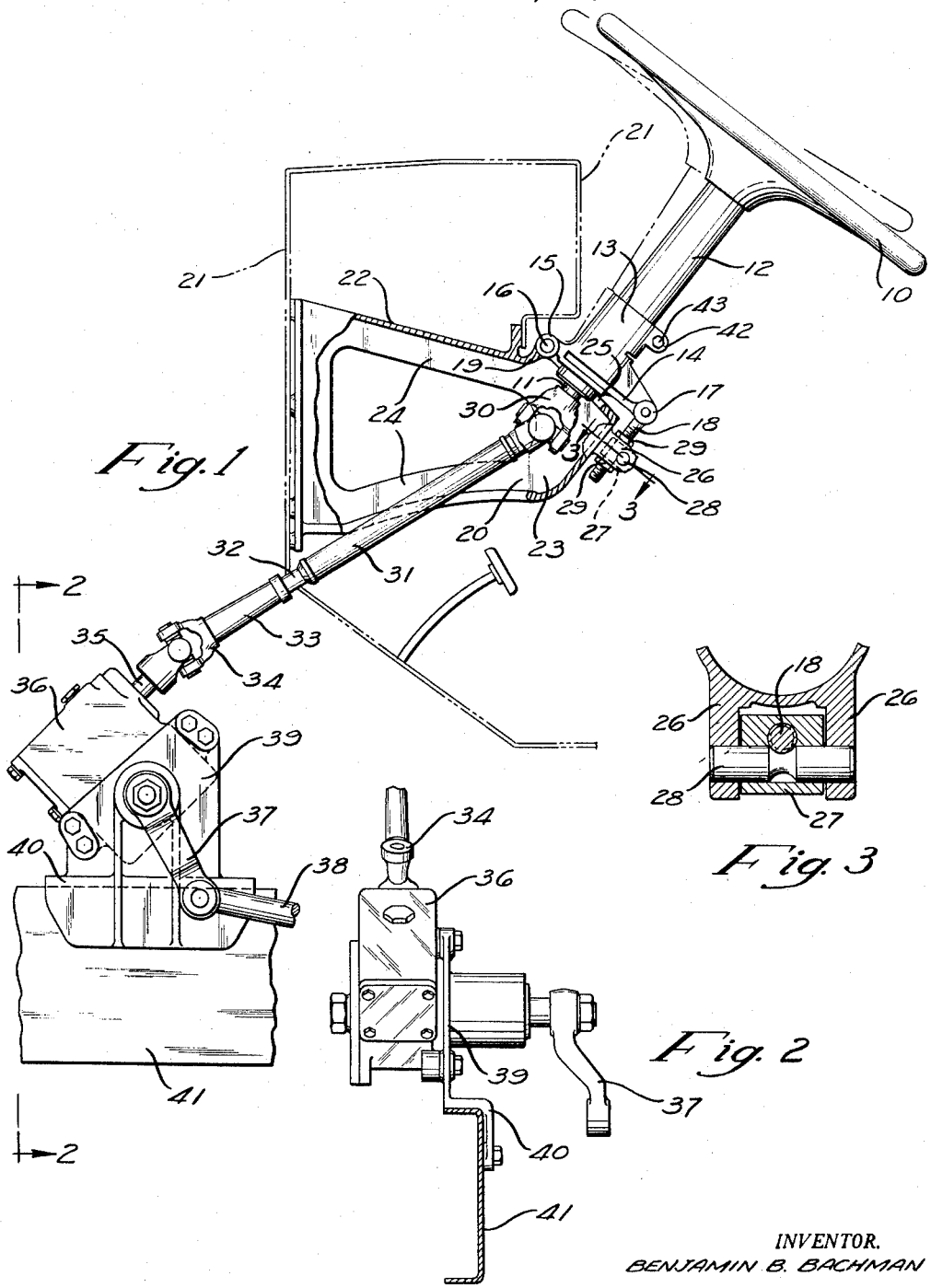

2,865,222
ADJUSTABLE STEERING WHEEL

Benjamin B. Bachman, Philadelphia, Pa., assignor to The White Motor Company, Cleveland, Ohio, a corporation of Ohio Application November 1, 1956, Serial No. 619,863

5 Claims. (Cl. 74—493)

This invention relates broadly to steering wheels for automotive vehicles and more specifically to mechanism for adjusting the steering wheel in angular relation to the steering column.

One of the objects of the invention is to provide a hinged connection between the steering column and the wheel to facilitate adjustment thereof into the most comfortable position for the driver.

Another object of the invention is to provide a pair of universal joints in the steering shaft to compensate for the altered length thereof upon adjustment of the wheel.

Further objects of the invention reside in the provision of an adjustable steering wheel assembly which is economic of manufacture, sturdy of structure and susceptible of adjustment with ease and dispatch.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 1 is a side elevational view of the improved steering wheel assembly;

Fig. 2 is a vertical sectional view through a vehicle frame illustrating the position of the steering gear thereon, the section being taken on a plane indicated by the line 2—2 in Fig. 1; and Fig. 3 is a transverse sectional view through the steering wheel bracket, the section being taken on a plane indicated by the line 3—3 in Fig. 1.

Referring first to Fig. 1, the steering wheel 10 is affixed to a shaft 11 mounted in a steering column 12 which is mounted in a tubular boss 13 in a hinge plate 14. The forward edge of the plate is formed with a lateral boss 15 which is drilled for the reception of a pin 16 and the lower edge thereof is provided with a bifurcated bracket 17 having a threaded eye bolt 18 pivotally mounted therein. The ends of the pin 16 are supported in a pair of lugs 19 in the forward face of a bracket 20 which is secured to the outer face of the cowl or instrument panel 21 on the vehicle. The bracket comprises a top wall 22, a hollow end portion 23 and a pair of spaced subtended webs or brackets 24. The upper face of the end portion of the bracket is formed with an aperture 25 therein for the reception of the steering shaft 11 and the outer rearward face of the end portion 23 of the bracket, is provided with a lug 26 machined to receive a block 27 drilled to receive the shank of the eye bolt 18 and retained in place by a transversely disposed pin 28 having a groove in the center thereof for the reception of the bolt 18. Lock nuts 29 are mounted on the bolt 18 in abutting engagement with the opposed faces of the block 27 to assure the stability of the plate in its adjusting position. The lower end of the steering shaft 11 is provided with a universal joint 30 coupled with a shaft extension 31 having a splined end portion 32 thereon which is slidably engaged with a broached sleeve 33. The sleeve 33 is provided with a second universal joint 34 keyed to the end of the worm shaft 35 mounted in a steering gear housing 36. The steering gear unit is of conventional form including the lever arm 37 which is connected to the steering drag link 38. The gear housing 36 is mounted on a vertical flange 39 of a bracket 40 having a lateral and subtended flange thereon that overlie respectively the top and outer side portions of the vehicle frame member 41.

When it is desired to alter the position of the steering wheel, the nuts 29 are first loosened, then eye bolt 18 is moved upwardly or downwardly, as the case may be, in the opening in the block until the plate 14 and the steering wheel carried thereby is disposed at the desired angle. The universal joints 30 and 34 accommodate the rocking movement of the plate about its fulcrum and the splined connection between the shaft extension 31 and sleeve 33 permits compensative lineal adjustment. When the wheel is suitably positioned, the nuts 29 are tightened against the block 27. The height of the steering wheel 10 may also be varied by adjustment of the steering column 12 in the tubular boss 13 in the hinge plate 14. The boss is formed with an axial kerf in the upper end thereof, and the bifurcated end portion thereof is provided with lateral lugs 42 which are cross drilled to receive clamping bolts 43. When vertical adjustment of the steering wheel is desired, the bolts 43 may be loosened, the column 12 elevated or depressed to the requisite position, then the bolts retightened. The splined connection between the steering shaft 32 and sleeve 33 and the universal joints 30 and 34 will afford such adjustment.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In a steering gear, the combination of a steering column, a rotatable steering shaft therein, a steering wheel affixed to one end thereof, a fixed bracket for the support of said steering column, a hinge plate pivoted to said bracket, said pivotal connection constituting the fulcrum for said hinge plate, a tubular boss on said hinge plate engaged with said steering column, a pair of bosses on said hinge plate having aligned openings therein, a pin in said openings, an eye bolt pivotally connected to said pin, a second boss on said bracket subjacent the bosses on said hinge plate, nuts on said eye bolt abutting said boss on said bracket to retain said hinge plate in vertical adjusted position, and means on said steering shaft to accommodate the movement thereof as said hinge plate is vertically adjusted.

2. In a steering gear, the combination of a steering column, a rotatable steering shaft therein, a steering wheel affixed on one end thereof, a universal joint on the opposed end of said steering shaft, a fixed bracket for the support of said steering column, a hinge plate pivoted to said bracket, a tubular boss on said hinge plate engaged with said column, a pair of spaced lugs on said bracket, a threaded eye bolt intermediate said lugs, a block, having an opening therein, mounted in said bracket, said eye bolt being slidably mounted in the opening in said block, and nuts on said eye bolt engaged with said bracket for the adjusted retention thereof.

3. In a steering gear, the combination of a steering column, a rotatable steering shaft therein, a steering wheel affixed on one end thereof, a universal joint on the opposed end of said steering shaft, a fixed bracket for the support of said column, a hinge plate pivotally mounted on said bracket, a tubular boss on said hinge plate engaged with said column, a block having an opening therein, said block pivoted in said bracket, an eye bolt extending through the opening in said block, said eye bolt being pivotally connected to said hinge plate for pivotal vertical movement relative thereto, jamb nuts on said eye bolt to restrain axial movement thereof when adjusted into abutting engagement with said bracket, a second steering shaft extended from said universal joint, and a second universal joint connected to said second steering shaft.

4. In a steering gear, the combination of a steering column, a rotatable steering shaft therein, a steering wheel affixed on one end thereof, a fixed bracket for the support of said steering column, a plate hinged to said bracket for vertical pivotal movement, a block mounted for pivotal movement in said bracket, a tubular boss on said plate engaged with said steering column, an eye bolt pivoted to said hinge plate, and nuts on said eye bolt abutting said bracket for the securement of said plate in adjusted position relative to said bracket.

5. In a steering gear, the combination of a steering column, a rotatable steering shaft therein, and a steering wheel affixed on one end thereof, a universal joint on the opposed end of said steering shaft, a fixed bracket for the support of said steering column, a plate hinged to said bracket for pivotal vertical movement, an eye bolt pivoted to said plate, means on said eye bolt engaged with said bracket to restrain axial movement thereof, and a splined connection in said steering shaft and said universal joint for axial movement of said steering shaft to accommodate vertical pivotal adjustment of said steering gear.

References Cited in the file of this patent

UNITED STATES PATENTS

| | | | |
|---|---|---|---|
| Re. 20,637 | Hammond et al. | Jan. 25, | 1938 |
| 720,936 | Law | Feb. 17, | 1903 |
| 990,915 | Slepicka | May 2, | 1911 |
| 1,048,748 | Seaman | Dec. 31, | 1912 |
| 1,344,005 | Ragan | June 22, | 1920 |
| 1,368,959 | Moller | Feb. 15, | 1921 |
| 1,523,568 | Wagner | Jan. 20, | 1925 |
| 1,534,680 | Bump | Apr. 21, | 1925 |
| 1,689,924 | Maloney | Oct. 30, | 1928 |
| 1,818,031 | Baits | Aug. 11, | 1931 |
| 1,920,890 | Rasmussen | Aug. 1, | 1933 |
| 2,716,032 | Barenyi | Aug. 23, | 1955 |
| 2,770,981 | Fieber | Nov. 20, | 1956 |
| 2,826,090 | Grinnell et al. | Mar. 11, | 1958 |
| 2,836,988 | Cashman | June 3, | 1958 |

FOREIGN PATENTS

| | | | |
|---|---|---|---|
| 11,175 | Great Britain | July 22, | 1915 |
| 484,978 | Great Britain | May 12, | 1938 |
| 459,584 | Canada | Sept. 13, | 1949 |